Nov. 8, 1927.
E. L. YOUNGER
DEHYDRATOR
Filed March 5, 1927
1,648,468
3 Sheets-Sheet 3
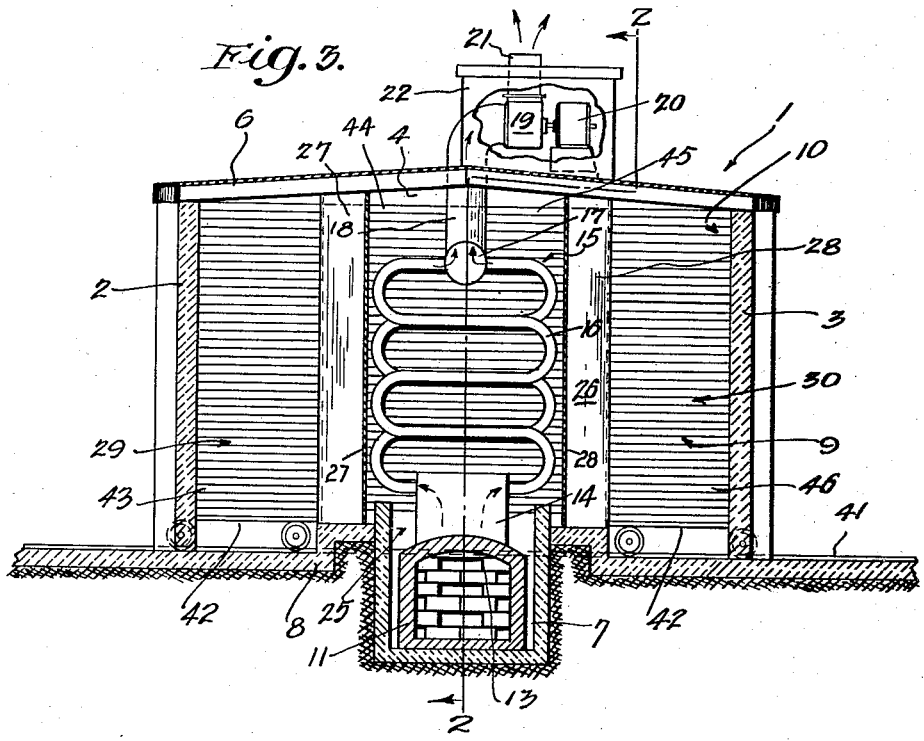
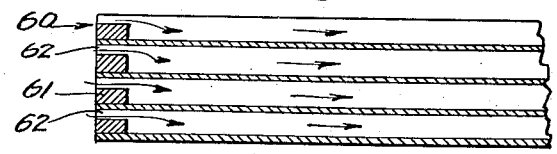
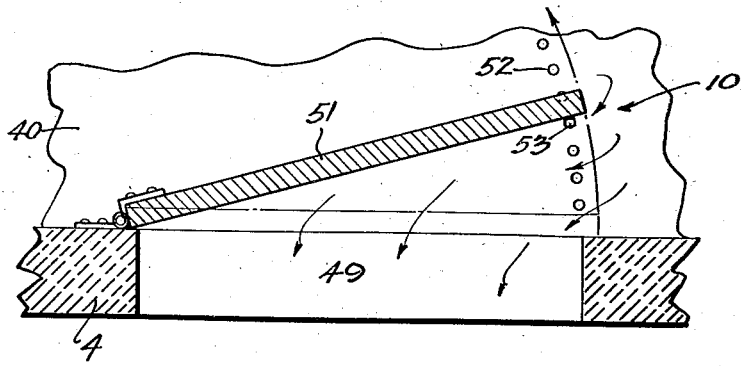
INVENTOR.
Ellard L. Younger
BY M. C. Frank
ATTORNEY Patented Nov. 8, 1927.

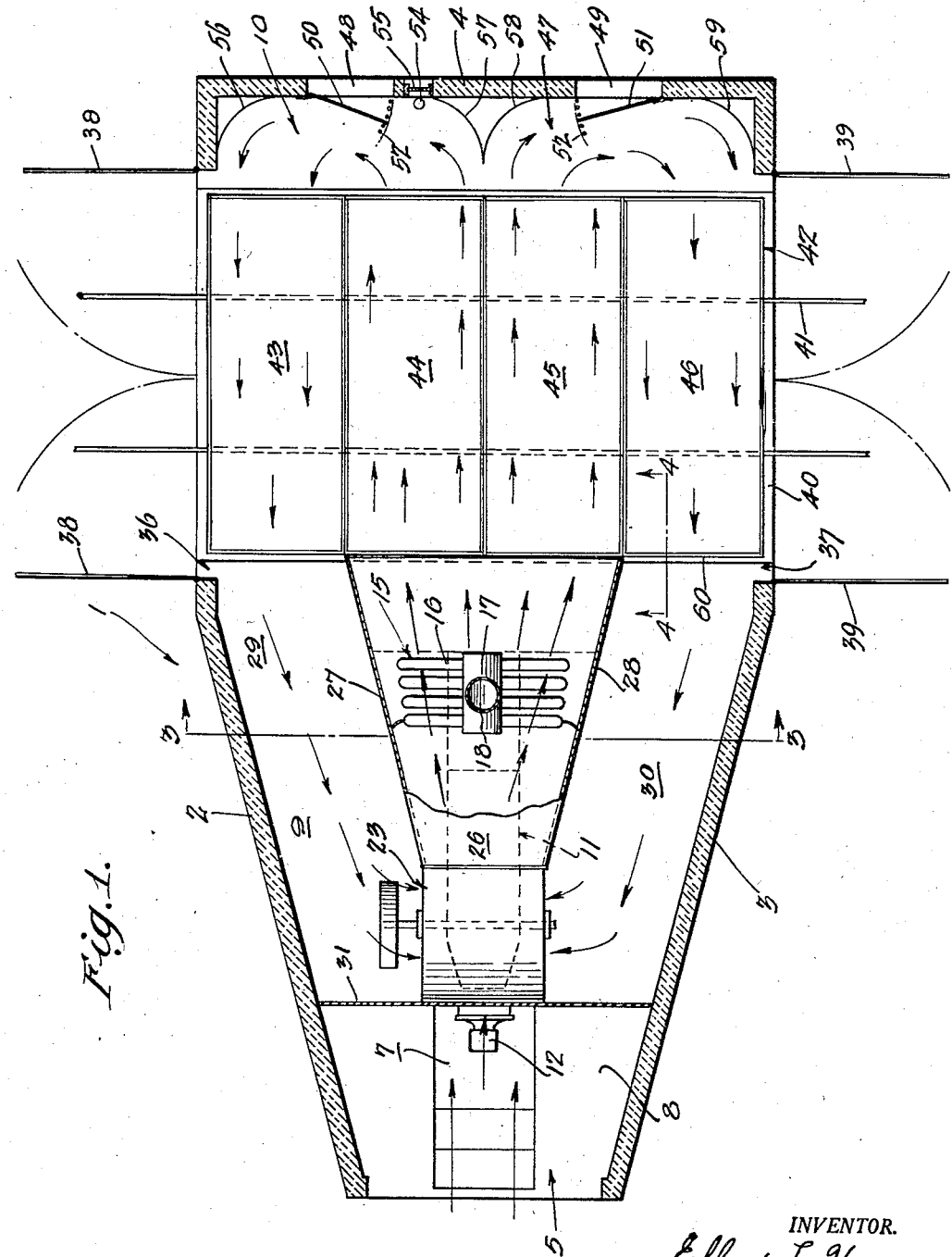

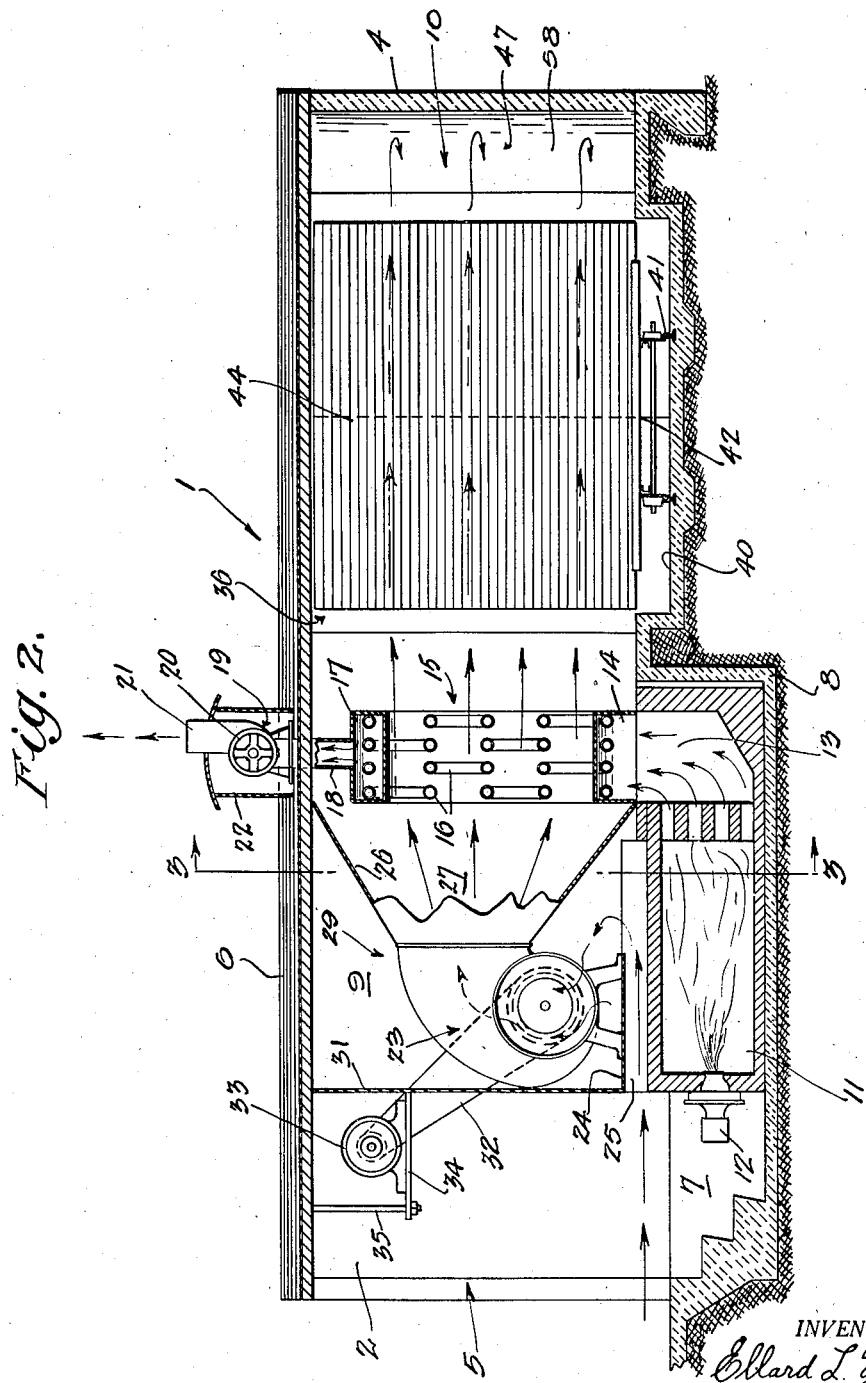

1,648,468

UNITED STATES PATENT OFFICE.

ELLARD L. YOUNGER, OF WOODLAND, CALIFORNIA, ASSIGNOR TO E. L. YOUNGER & SONS, OF WOODLAND, CALIFORNIA, A COPARTNERSHIP COMPOSED OF E. L. YOUNGER, ELLARD L. YOUNGER, AND M. A. YOUNGER.

DEHYDRATOR.

Application filed March 5, 1927. Serial No. 172,958.

My invention relates to improvements in dehydrators generally, and in particular to that class of dehydrators which remove the moisture from fruits or other food products by the continuous circulation therethrough of a column of preheated air which is kept in constant motion by means of a pressure blower.

The present invention is an improved form of dehydrator of comparatively small capacity and is especially designed for use on small fruit farms and other places, and is adapted for use in the drying of fruit, such as prunes, in quantities ranging from five to six tons per twenty-four hours.

A dehydrator constructed in accordance with the principles of this invention costs considerably less to install than the ordinary dehydration plant, is very efficient in its operation, and consumes much less fuel per ton of fruit handled. The present construction is a reduced and exceedingly compact form of apparatus over existing dehydrators that I am aware of.

The structure of my invention has added improvements over similar devices that increases its efficiency to a marked degree, among these being the addition of an exhaust blower associated with the furnace and radiator and adapted to create better combustion in the furnace and to prevent its burning out prematurely, also to effect a quick cooling of the furnace and radiator when their cooling is desired for repair work.

The primary object of my invention is to provide a dehydrator which is simple in construction, inexpensive to manufacture and maintain, and which is especially adapted for use on small fruit ranches in handling comparatively small quantities of fruit at a minimum cost per ton of fruit handled.

Another object of my invention is to provide an improved dehydrator that embodies, as one of its essential features, a fan blower which is positioned within the structure in such a manner that a column of heated fresh air is kept in continuous circulation throughout the structure, and is forced directly through the crated fruit which is arranged in tiers adjacent the radiator.

An additional object of my invention is to provide a dehydrator of the class designated, which embodies in its construction a novel furnace arrangement that includes an exhaust blower arranged exterior to and above the dehydrator and adapted to create a strong draft through the radiator flues to assist the combustion in the furnace and to impart a rapid exchange of heat to the incoming fresh air flowing between and past the radiator flues.

Still another object of my invention is the provision of a dehydrator structure which is designed to include a furnace which is positioned in close proximity to the drying chamber to conserve space, and in which the main blower is arranged above the furnace and in a direct line and immediately adjacent the crated fruit in the drying chamber.

Referring to the accompanying drawings:

Figure 1 is a plan sectional view showing the relative arrangement of the various parts constituting the preferred embodiment of my invention, the arrows therein indicating the direction of the flow of the air currents which are driven outwardly by the blower in a central column and distributed through the central tiers of trays and returned to the blower at both sides of the structure;

Figure 2 is a longitudinal sectional view taken through the entire structure and showing the blower, furnace, radiator, drying chamber and exhaust blower, the section being indicated by the line 2—2 of Figure 3;

Figure 3 is a transverse sectional view taken in front of the radiator and looking rearwardly toward the drying chamber, the section being indicated by the line 3—3 of Figs. 1 and 2;

Figure 4 is an enlarged sectional detail illustrating a tier of trays with cut-down end sections constructed for use with my invention and providing means for the free circulation of heated air therethrough, the section being indicated by the line 4—4 of Figure 1; and Figure 5 is an enlarged sectional detail of one of the rear closures of the drying chamber through which the over-humid air is allowed to escape, and illustrating the method of adjusting said closure to graduate the flow of air from the drying chamber.

Referring with greater particularity to the drawings, the numeral 1 designates the whole structure in a general way which includes side walls 2 and 3, rear wall 4, open front section 5, roof 6 and furnace pit 7, the whole with the exception of the roof 6 being preferably constructed of cement and having a cement foundation 8 extending under the entire structure. The structure as thus formed is divided longitudinally into a furnace pit 7, blower and radiator compartment 9, and a drying chamber 10.

The furnace 11 is of ordinary construction and is positioned in the pit 7, as shown in Figs. 2 and 3, and is provided at its front end with an oil burner 12 and at its rear end with an upwardly extending flue 13, which is capped by a hood section 14 forming the lower section of the radiator 15 which is positioned above the furnace as shown.

The radiator 15 consists of a plurality of sections 16 arranged side by side and providing a plurality of convolute sections arranged intermediate the lower manifold 14 and the upper manifold 17 thereof and communicating with both of said manifolds.

The manifold 17 is connected to a stand pipe 18 which extends through an opening in the roof 6 and is in turn connected by an elbow to an exhaust-blower 19 mounted upon the roof of the structure and adapted to be driven by a direct-connected motor 20 mounted adjacent thereto; said blower having an exhaust pipe 21 extending through the housing 22 and communicating with the atmosphere, Figs. 2 and 3.

The main blower 23 is mounted upon a horizontal partition 24 which is spaced above the top of the furnace 11 sufficiently to provide a fresh air inlet 25 which communicates with the open front 5 of the structure and with the compartment 9, so that the blower 23 will at all times draw in a limited supply of fresh air in addition to that being circulated within the structure.

The blower 23 is provided with a rearwardly-flared hood 26 which extends to the top and bottom of the structure and encloses the radiator 15, as shown in Fig. 1. The sides 27 and 28 of the hood 26 are spaced apart at their rear ends a distance equaling that of the width of two tiers of fruit trays and form at opposite sides thereof passages 29 and 30 each equal to the width of one tier of fruit trays.

The main blower 23 is mounted inside the partition 31 and is driven by a belt 32 connected to a motor 33 mounted outside said partition 31 and carried by a base 34 and truss rods 35 which are secured to the roof of the structure.

The drying chamber 10 is provided with oppositely disposed openings 36 and 37, carrying respectively, swinging sets of doors 38 and 39 adapted to close the drying chamber 10 tightly when desired.

The drying chamber 10 is provided with a recessed floor 40 in which is mounted a transversely arranged track 41 extending through both door openings 36 and 37, and adapted to carry a plurality of trucks 42, Figs. 2 and 3, upon which are mounted a plurality of tiers of fruit trays 43, 44, 45 and 46 positioned to extend close to the roof 6 and arranged to barely clear the end of the hood 26 when moved into the chamber 10, and adapted to completely fill said compartment with the exception of a rear space 47.

The rear wall 4 of the structure is provided with a plurality of openings 48 and 49 provided, respectively, with hinged closures 50 and 51 adapting each to be adjusted to any desired degree by means of a plurality of arcuately arranged holes 52 formed in the floor and into which pegs 53, Figure 5, may be inserted to hold said closures in any desired position. These closures may be adjusted to the proper degree from time to time to allow of the escape of a predetermined volume of over-humid air to maintain the proper temperature and humidity within the drying chamber, this being determined by a reading of the hygrodeik 54 which is mounted within the chamber 10 immediately in the rear of a peep-hole 55 mounted in the rear wall 4 of the structure.

The rear space 47 of the chamber 10 is provided with a plurality of curved sheet-metal sections 56, 57, 58, and 59 adapted to deflect the air currents which emerge from the central tiers of trays 44 and 45, backwardly through the side tiers of trays 43 and 46 and thence into the side passages 29 and 30 of the structure, from whence they are drawn into the main blower 23 and recirculated.

The trays 60 which are used in connection with this structure are provided with cut-down front and rear ends 61 which form openings 62 through which the heated air is forced by the blower 23.

The exhaust blower 19 draws the products of combustion through the coils of the radiator 15 and creates a draft for the furnace 11 and causes its proper functioning.

It will be apparent from the foregoing description that I have produced a compact structure in which the main blower, radiator and drying chamber are positioned in a direct line and are so arranged relative to each other so that a maximum volume of heated air is forced through the radiator and directly into the trays carrying the fruit without any appreciable loss of heat due to radiation or leakage, and that I have additionally provided a structure which may be installed on small ranches at a much less cost than the present structures for this purpose.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made, when desired, as fall within the scope of the appended claims.

Having thus described my invention, I claim as new and desire to secure by Letters Patent of the United States, the following:—

1. A dehydrator of the class described comprising an enclosure embodying a front open section, an intermediate compartment and a drying chamber; a furnace mounted in said open section, a blower and a radiator mounted in said intermediate compartment, a hood mounted between said blower and the drying chamber and enclosing said radiator and forming a centrally disposed hot air passage and oppositely disposed return air passages, means mounted in said drying chamber for carrying a plurality of tiers of fruit trays, the central tiers of which are disposed in front of said hood with the side walls of certain of said central tiers constituting a continuation of the passage defined by said hood and the side tiers of which are disposed in front of said return air passages, and deflector means carried by said drying chamber consisting of curved sections and being adapted to deflect the air currents rearwardly into the side passages as received from said blower.

2. A dehydrator of the class described comprising a structure embodying a front open section, an intermediate compartment and a drying chamber all arranged longitudinally within said structure; a furnace mounted in said open section and a blower mounted in said intermediate compartment above said furnace, an air inlet passage extending between said furnace and blower and communicating with said intermediate compartment, a radiator mounted intermediate said blower and drying chamber, and a hood having a width at its outlet equal to the width of one or more fruit trays mounted in said intermediate compartment; said hood being flared outwardly and forming a comparatively air-tight passage between the blower and drying chamber and communicating with the latter, air passages formed at the sides of said hood and communicating with said drying chamber and the blower inlet, and means mounted in the rear wall of said closure for governing the egress of over-humid air from the dehydrator.

3. A dehydrator of the class described comprising a structure embodying a contiguously arranged front open section, an intermediate compartment and a drying chamber; heating means mounted in said open section, blower means mounted in said intermediate compartment, a centrally disposed air passage extending between said blower and drying chamber having a width at its outlet equal to the width of one or more fruit trays, return air passages formed at the sides of said central air passage and communicating with said drying chamber and the inlet sides of said blower means, means for positioning a plurality of tiers of fruit trays in said drying chamber, means for forcing heated air through the central tiers thereof and directing deflector members arranged in said drying chamber for deflecting said air rearwardly and forcing it through the outer tiers of said trays and thence into said side passages for its return to the blower for recirculation.

4. A dehydrator of the class described comprising a structure embodying an open front section, an intermediate compartment and a drying chamber; heating means mounted in said open section, blower means mounted in said intermediate compartment, a centrally disposed air passage between said blower and drying chamber having a width at its outlet equal to the width of one or more fruit trays, return air passages formed at the sides of said central air passage and communicating with said drying chamber, means for positioning a plurality of tires of fruit trays in said drying chamber, means for forcing heated air through the central tiers thereof with certain side walls of said tiers constituting a continuation of said central air passage, and directing deflectors arranged in the corners of said drying chamber for deflecting said air rearwardly through the outer tiers of trays, and adjustable means for allowing the escape of over-humid air from said drying chamber to the atmosphere.

5. A dehydrator of the class described comprising a structure embodying a front open section, an intermediate compartment and a drying chamber all arranged longitudinally within said structure; a furnace mounted in said open section and a blower mounted in said intermediate compartment above said furnace, an air inlet passage extending between said furnace and blower and communicating with said intermediate compartment, a radiator mounted intermediate said blower and drying chamber, and a hood having a width at its outlet equal to the width of one or more fruit trays mounted in said intermediate compartment; said hood being flared outwardly and forming a comparatively air-tight passage between the blower and drying chamber and communicating with the latter, air passages formed at the sides of said hood and communicating with said drying chamber and the blower inlet, and means mounted in the rear wall of said closure in alinement with the side walls of the outlet of the hood for governing the egress of over-humid air from the dehydrator.

In testimony whereof, I affix my signature.

ELLARD L. YOUNGER.